June 14, 1927.

H. GOODMAN 1,632,026

DIRIGIBLE HEADLIGHT FOR MOTOR VEHICLES

Filed July 17, 1926  2 Sheets-Sheet 1

Harry Goodman INVENTOR.

BY Loyal J. Miller
ATTORNEYS.

June 14, 1927.
H. GOODMAN
1,632,026
DIRIGIBLE HEADLIGHT FOR MOTOR VEHICLES
Filed July 17, 1926
2 Sheets-Sheet 2

Harry Goodman INVENTOR.
BY Loyal J. Miller
ATTORNEYS.

Patented June 14, 1927.

1,632,026

UNITED STATES PATENT OFFICE.

HARRY GOODMAN, OF BRITTON, OKLAHOMA.

DIRIGIBLE HEADLIGHT FOR MOTOR VEHICLES.

Application filed July 17, 1926. Serial No. 123,180.

My invention relates to improvement in dirigible headlights for motor vehicles.

The object of my invention is to provide a device of the character described which will be novel, of great utility, substantial, and provide for efficiency in connecting and disconnecting the lights of motor vehicles so as to be operable with the steering wheel and be substantial and dependable; another object of the invention is to provide automatic locking means for the headlights in central position when disconnected from the steering wheel and column.

Figure 1:
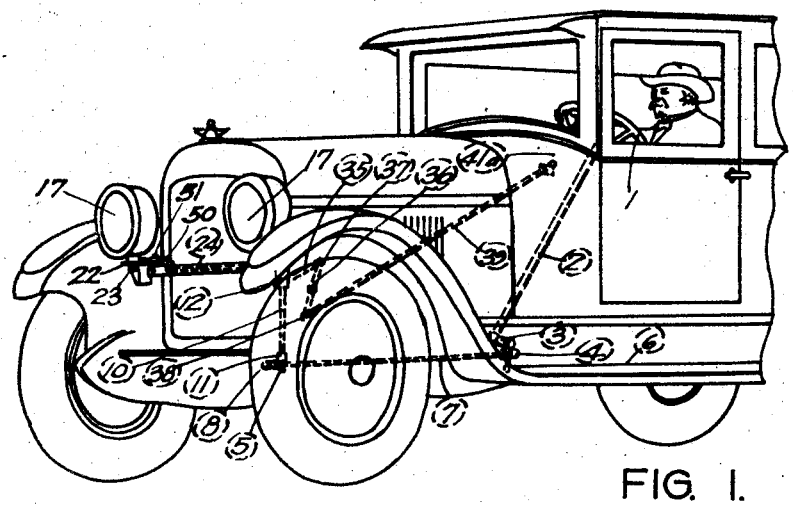
Figure 2:
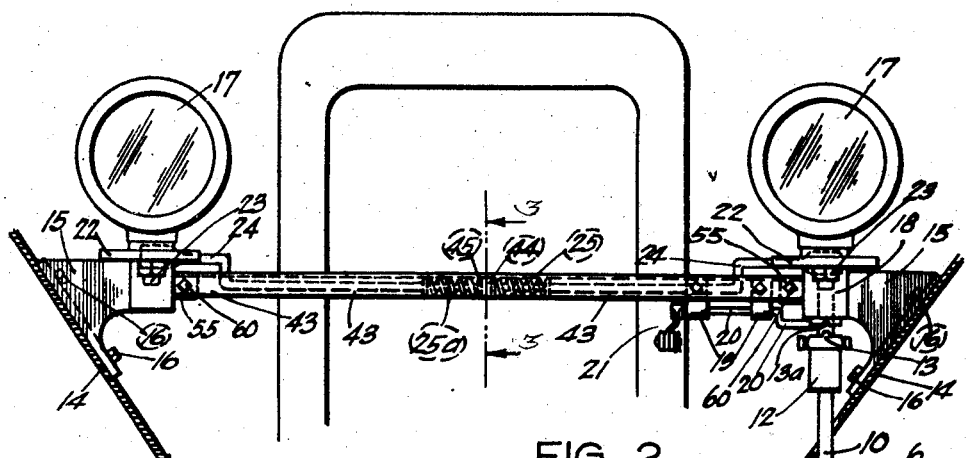
Figure 3:
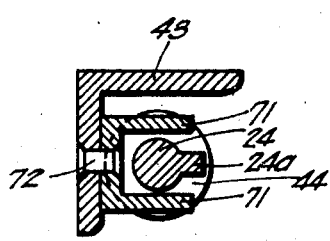
Figure 4:
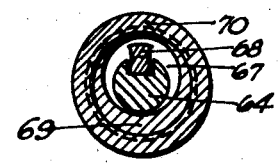
Figure 5:
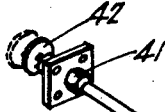
Figure 6:
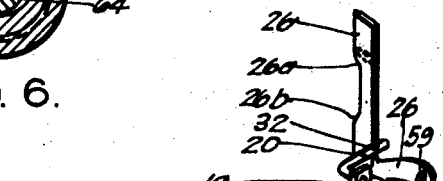
Figure 7:
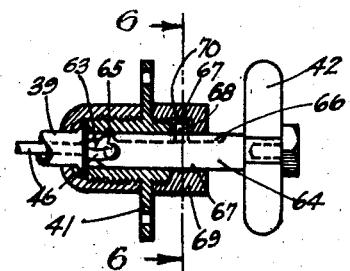
Figure 8:
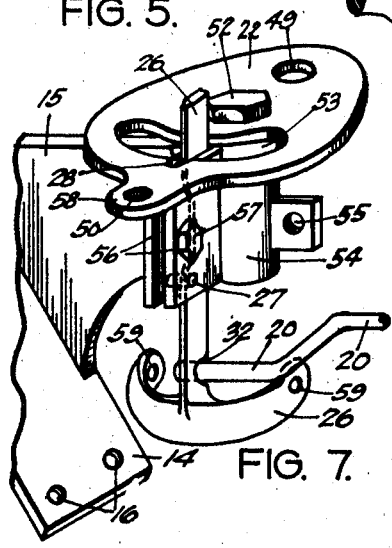
Figure 9:
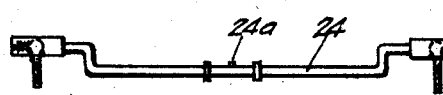

Other objects, novel features, and details of construction, and invention will be apparent in the specification and claims, and illustrated in the accompanying two-sheet drawing, of which, Figure 1 is a diagrammatic perspective view of the device applied to an automobile; Figure 2 is a front elevation showing the lower part in perspective; Figure 3 is a section view of the centering apparatus and frame work connecting the two lights on the line of 3—3 of Figure 2; Figure 4 is a perspective view showing means in detail for clutching and unclutching the headlights; Figure 5 is a sectional view of the dash and handle control; Figure 6 is a sectional view on the line of 6—6 of Figure 5; Figure 7 is a fragmentary perspective view of the light seat and the clutch control, and means for locking lights in central position; Figure 8 is a side elevation of the light seat and a part sectional view of the operating clutch assembly, and their housing; Figure 9 shows an alternate means for attaching and operating the lights.

Like characters denote like parts throughout the several views.

I obtain the objects of my invention by the mechanism described as follows:

The steering wheel 1 operates steering column 2 and connects with arm 3 projecting laterally from said steering column 2 through frame 6 and connecting by ball and socket 4 on rod 7 and ball and socket 8 with ball arm 5 on lower end of shaft 10; this is held in place relative to frame by bracket 9 and adjustable lug, washer, and set screw 11. The lower clutch member housing 12, houses a portion of said shaft 10, which has a collar 30 there-surrounding. This is held in place on said shaft by pin 30$^a$; above this collar is a compression coil spring 29 with its lower end resting on top of said lower clutch member collar, its upper end supporting the housing of the lower clutch and a stationary collar 31$^a$ thereabove having two oppositely outwardly extending teats 31; on its upper side is a plurality of upwardly extending clutch teeth 13; said compression coil spring 29 surrounds the lower portion of said shaft 10 and the housing 12 surrounding the shaft is held in place by a key 62 upon which it is permitted to slide up and down. The upper clutch member 18 is hollow and surrounds the upper part of shaft 10. Said upper clutch member 18 turns in the housing on bearings 61 intermediate the recessed portion 18$^a$ and its housing 54. The upper end 10$^a$ of shaft 10 is reduced in size from the point where it enters the upper clutch member. In the lower end of said clutch member is a plurality of grooves 13$^a$ adapted to fit and to co-act with a plurality of clutch teeth 13. A light plate 22 is adapted to fit above the housing 54 and is fastened on the upper end of shaft 18 by threaded bolt 52, and by dowel-pin 52$^a$ fitting into a recess 52$^b$ in the lower side of said light plate and the recess 52$^c$ in the upper end of shaft 18. Integral with the housing of said upper clutch member is a small outstanding lug with perforation 55 therein adapted to be fastened to angle iron 43 hereinafter mentioned. Also integral therewith are two outstanding parallel plates 56 adjustably held in position by set screw 57, and there-between is a trigger guide 27. The automobile lights 17 are held in place on light plate 22 by bolt 23 through perforation 49 and washers 47 and 48. These washers have oval shaped perforations to allow for adjusting the positions of the lights. The light-plate 22 situated on the driver's side of the vehicle in addition to said perforation 49, has a perforation therethrough 50 in an outstanding tongue 58; it also has a semicircularly formed slot 53 in one side near said tongue 58 with a locking slot 28 in the outer central portion of the same adapted to receive a hereinafter described trigger 26.

The clutch assembly is supported and fastened to fender 14 by bracket support 15 and bolts 16. The brackets 15 supporting the clutch assembly, shaft and the two lights are connected by angle iron 43 and bolts 60 passing through perforations 55 in outstanding lugs. In one side of said angle iron 43 is riveted by rivet 72, a U-shaped form 71 partially surrounding connecting rod 24 and separating washers 44 and 45.

Said connecting rod 24 operates back of said angle iron 43 between outstanding members 71, 71, through said U-shaped member, and is anchored at its bifurcated ends by bolts 51 through perforations 50 to light plates 22. At the center of said connecting rod 24 and on the outside of said U-shaped member are washers 44, 45. On the outside of each of said washers and around said rod 24 is a compression spring 25$^a$, each connects at its outer end to said rod 24, and each at its inner end abuts respectively against said washers 44 and 45. In the center of said connecting rod 24 and between said washers is an outstanding lug 24$^a$. In front facing position of said lights said compression springs 25$^a$ press equally against said washers 44 and 45. When the light shifting apparatus is connected for operative movement with the clutching means and steering column the turning of the steering wheel—say to the right—causes the first light 17 on the driver's side of the car to turn to the right, and the clutching means connects with it and tongue 58 on the rear of light plate 22 to be twisted towards the left, drawing connecting rod 24 in the same direction. This causes the opposite end of connecting rod 24 at its bifurcated ends to turn on bolt 51 through hole 50 and to pull plate 22 at said second light 17 also to the left thereby turning said second light on its light plate to the right and on a line parallel to and in the direction in which said first light is faced. In such process connecting rod 24 being forced to the left draws on clamping means which fastens compression spring 25$^a$ to the connecting rod 24 and causes compression spring 25$^a$ to be compressed between said clamping means and washer 45, and said washer is caused to abut against arms 71, 71, of the U-shaped form; the lug 24$^a$ on connecting rod 24 is permitted to catch on washer 44 and draw it and compression spring 25 with and along the line of the throw of said connecting rod 24 until such time as it is desired to reverse the movement of the steering wheel and the facing of the lights. It will be observed in this movement compression spring 25 is not compressed between washer 44 and the clamping means fastening same to connecting rod, but simply allows it to move along the line with the movement of said rod 24. When the lights are then desired to be shifted in the opposite direction by the turning of the steering wheel and the parts working in connection therewith the opposite process to the one just described is repeated. Upon each change of the light shifting apparatus from the dirigible feature of their use to the front facing position of the lights, said two compression springs with their anchoring on said rod 24 and their respective washers 45 and 44 and the arms 71, 71, of said U-shaped form and the lug 24$^a$ centrally located on said rod 24 work to re-establish the central forward fronting of the lights.

The pulling of control handle 42 causes shaft 64, passing through dash-board 41$^a$ and dash bracket 41, to turn, and causes eye 65 in its lower end connecting with eye 63$^9$ in upper end of cable 46 housed in housing 39, to turn, thus turning said cable 46. The handle shaft 64 is provided with a key-way 66 in a portion of its periphery, and its housing has therein a cam 67; this is so arranged as to come nearer one side 70 than the other side 69, and a floating lug 68 is so arranged as to drop in said key-way in said shaft 64 and to permit its turning, as it is desired, to shift the lights; but when it is desired that the lights face the front in a stationary position the pulling of handle 42 turns shaft 64 and causes the loose lug 68 to partially leave the key-way 66 and to press against the outer periphery of the cam recess 67 and thereby lock the lights in a front facing position.

The pulling of knob 42 pulls cable 46, adjustably held in place by set screw 38, through housing 39, which housing is held in place by clamp 40 to bracket 33; it then acts on arm or link 34, which is pivoted at link pivot 36 also attached to bracket 33. The pulling of said cable causes link pin 37 at the upper end to pull on the upper arm 35 of the dash control apparatus and at the lower end 35$^a$ thereof to push on the lower end of the arm 21 connecting the clutch trip rod 20. Said rod 20 is anchored by two brackets 19 to angle iron 43. Beyond the second anchoring 19 it is bent in the form of a crank handle, the outer portion being adapted to fit into a groove 32 in the lower portion of the locking trigger 26. Said locking trigger 26 has an upstanding arm; the front edge of its upper portion is thinned or bevelled, and its central front edge is recessed forming a guide-way between bevels 26$^a$ and 26$^b$. Its movement in and out of locking slot 28 is controlled by trigger guide 27 fitting between double outstanding cleats 56. A semi-circular arm at its base, integral with said trigger 26 has two oppositely situated perforations 59 in the ends of said arm, adapted to fit on teats 31 oppositely situated on clutch release collar 31$^a$. When trigger is raised and in its normal position as shown in Figure 4 (not by the dotted-in portion) the lights are in a movably operative position with the steering wheel, and turn with the changing positions of the steering wheel, and the upper clutch member 18 at 13$^a$ and lower clutch member 12 and 13 are connected. When it is desired to have said lights immovable (as is usually the case for day time use) the pulling of knob 42 operating the dash-board control causes said trigger 26 to be lowered as shown in Fig. 4 (dotted-in portion) and Fig. 8. This releases the lower clutch at clutch teeth 13 from their companion openings 13ᵃ of the upper clutch member and thrusts the upper end of trigger 26 between cleats 56 and into locking slot 28. This permits steering gear and wheel to be used as desired without moving the lights. To make this more secure the knob 42 may be turned to the right or left locking the wire or cable 46 and not permitting further connection between said clutch teeth 13 and their companion openings 13ᵃ until voluntarily unlocked, and the wire or cable 46 to be slipped into place connecting 13 and 13ᵃ and releasing trigger 26 from trigger slot 28.

It is understood that in addition to the means of connecting light plates 17 and rod 24 by tongue 58 and bolt 51 and bifurcated ends of said rod, other means may be used such as ball and socket as is shown in Fig. 9.

From the description and the accompanying two-page drawing, and the specification, the advantages of construction, application and manufacture will be apparent to those familiar with the art to which my invention pertains. I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having thus described the invention, what is claimed and desired to be secured by Letters Patent is:

1. In a device of the character described, a headlight supporting shaft, a headlight and extension rod all in connection with a light-plate; a second light-plate, headlight and shaft; said extension rod connecting said light-plates and movable therewith; clutch means to connect said shafts for revoluble movements in unison, and to disconnect the same; means for simultaneously moving said head-lights; bracket means and angle iron adapted to anchor said device to the fenders of a motor vehicle; two compression coil springs surrounding said extension rod in the center and co-acting with clamps, washers and holding means to automatically force said headlights to a front facing position when disconnected from the moving means for said headlights; means connecting said shafts and clutching means with the stearing mechanism and frame of a motor vehicle.

2. In a device of the character described, comprising a pair of headlight supporting shafts, an extension rod for one of said shafts alined therewith and revoluble with respect thereto; means to connect a pair of shafts for movement in unison; a clutch member fixed on said extension; a second clutch member on one of said shafts and co-operating with the first clutch member; means for operatively connecting said shafts and clutching means with the steering mechanism and frame of a motor vehicle; means for simultaneously moving said headlights in unison on clutching said clutching means; means securely anchoring said headlights and device to the fenders of a motor vehicle; means for movably and revolubly positioning said headlights and device; spring means adapted to automatically forwardly position said headlights upon the releasing of clutching means; all substantially as described.

3. The combination with a steering mechanism, dashboard, headlights, frame, and front fenders of a motor vehicle, of a device of the character described, comprising two vertical shafts, a light-plate, a second light-plate, and means adapted to adjustably connect said headlights to said light-plates; clutch means on one of said shafts; means for operatively connecting the lower shaft with said steering mechanism and the frame of the vehicle; locking means for locking said clutch means in inoperative position; a connecting rod and brackets securely fastening said device to the fenders; means connecting said light-plates and revolubly simultaneously turning said headlights on said light-plates in unison and in parallel lines; two compression coil springs surrounding said extension rod in the center and co-acting with clamps, washers and holding means to automatically force said headlights to a front facing position when disconnected from the moving means of said headlights; all substantially as described.

4. In a device of the character described, comprising, means connecting the stearing mechanism of a motor vehicle with the lower shaft and clutch of a double shaft and double clutch member, adapted to operatively revolve the same; a collar, compression spring and housing surrounding the lower portion of said lower shaft; a collar with a plurality of clutch teeth thereabove, and a plurality of outstanding teats on its periphery; a second shaft member and a second clutch member therearound; a recess in the lower central portion thereof adapted to receive the upper end of the lower shaft; a plurality of recesses in said upper clutch member adapted to fit said plurality of said teeth; a light-plate adapted to hold the headlight, and to connect with a movable connecting rod having bifurcated ends; said plate having a semi-circularly formed slot therein adapted to receive an upstanding movable trigger; and having a locking slot therein to receive said trigger for locking purposes; a second light-plate adapted to hold a second light and to be connected with same by said movable rod; two compression coil springs surrounding said connecting rod in the center and co-acting with clamps, washers and holding means to automatically force said lights to a front facing position when disconnected from the moving means of said lights; a knob, an adjustable wire through the dashboard bracket, three arms, and a crank, co-acting with each other and with a two-armed clasp and trigger adapted to connect said clutch toothed collar and to operatively clutch and unclutch said clutching means; locking means on said knob and wire to operatively lock and unlock said clutching means in an unclutched position; all substantially as described.

HARRY GOODMAN.